F. SEABERG.
DOOR OPERATING MECHANISM.
APPLICATION FILED SEPT. 19, 1908.
1,000,555.
Patented Aug. 15, 1911.
2 SHEETS—SHEET 1.
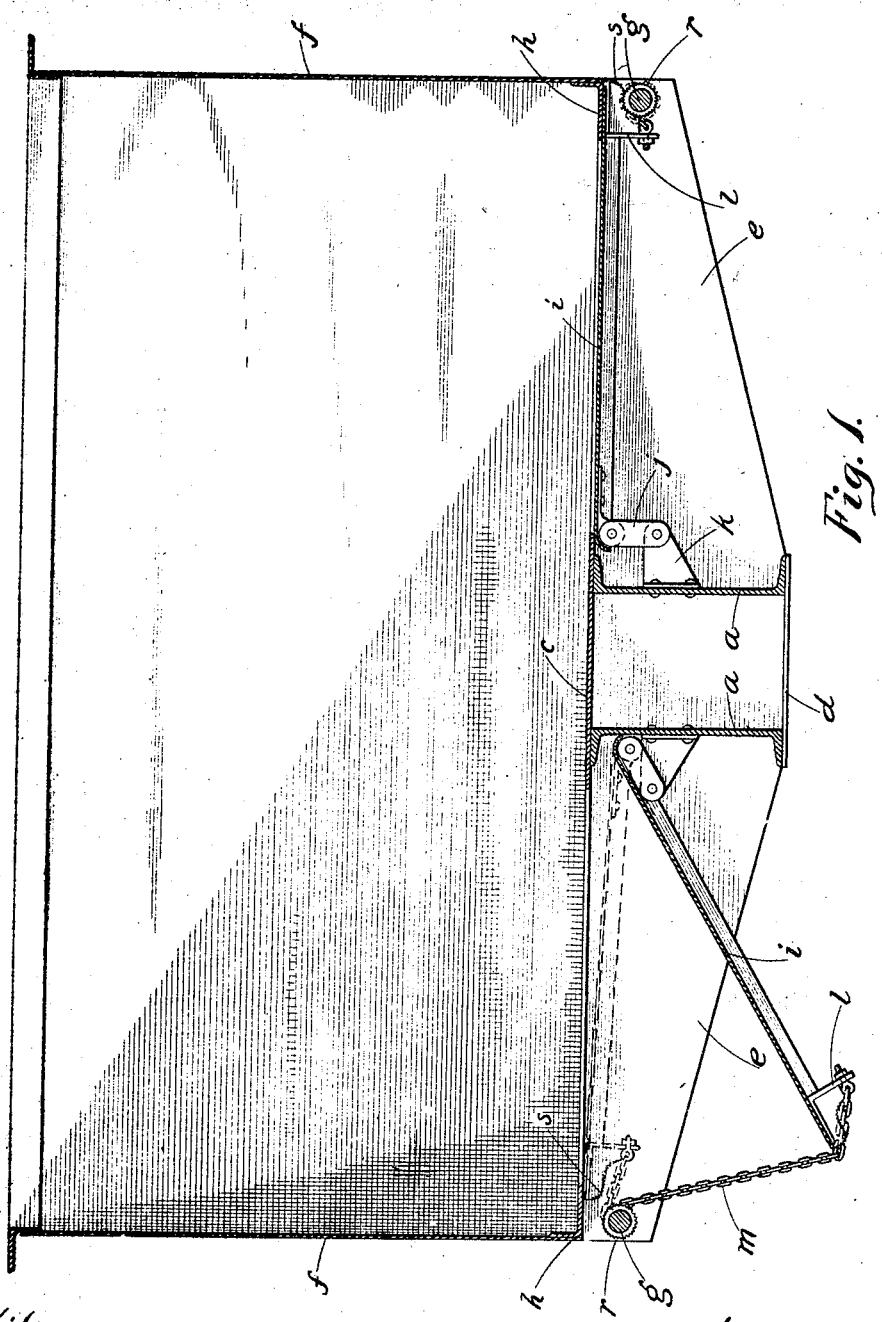
Witnesses:
Anna L. Walton
Edythe M. Anderson.
Inventor:
Frederick Seaberg
By Sheridan & Wilkinson
Att'ys

F. SEABERG.
DOOR OPERATING MECHANISM.
APPLICATION FILED SEPT. 19, 1908.

1,000,555.

Patented Aug. 15, 1911.
2 SHEETS—SHEET 2.

Witnesses:
Anna L. Walton
Edythe W. Anderson

Inventor:
Frederick Seaberg
By Sheridan H. Wilkinson
Attys

UNITED STATES PATENT OFFICE.

FREDERICK SEABERG, OF CHICAGO, ILLINOIS, ASSIGNOR TO NATIONAL DUMP CAR COMPANY, OF CHICAGO, ILLINOIS, A CORPORATION OF MAINE.

DOOR-OPERATING MECHANISM.

1,000,555.  Specification of Letters Patent.  Patented Aug. 15, 1911.

Application filed September 19, 1908. Serial No. 453,819.

*To all whom it may concern:*

Be it known that I, FREDERICK SEABERG, a citizen of the United States, residing at Chicago, in the county of Cook and State of Illinois, have invented certain new and useful Improvements in Door-Operating Mechanism, of which the following is a specification.

My invention relates to that class of dump cars which are designed primarily to be used either as general service gondola cars or as drop bottom dump cars.

My improved mechanism possesses the advantage of providing a winding chain for raising the dump doors and a fixed and rigid support for the doors when closed, thus removing all strain from the operating chains when the doors are closed and sustaining their load,—this object being attained without the introduction of complicated parts.

Figure 3:
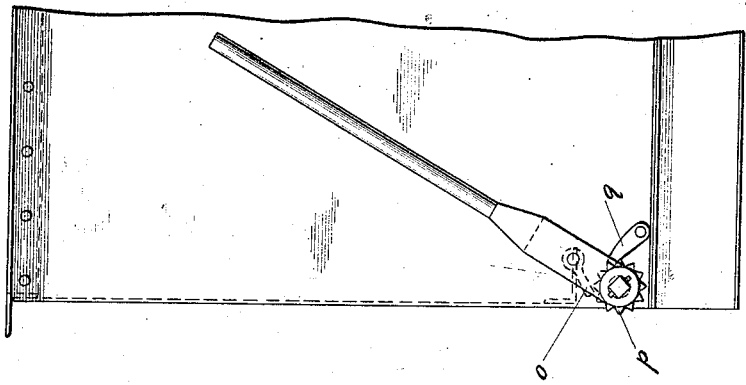
Figure 2:
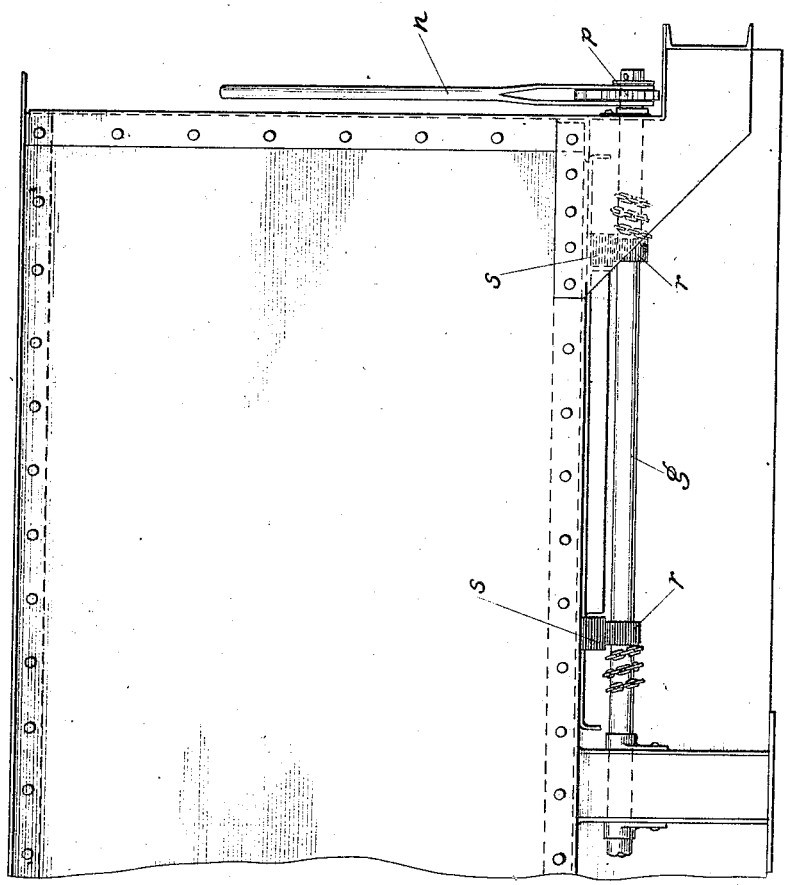

Referring to the drawings—Figure 1 is a transverse section of a car constructed in accordance with my invention. Fig. 2 is a side view of part of the end portion of the car; and Fig. 3 is a fragmentary view of the end of the car, showing the operating lever.

In the drawings, which illustrate a specific embodiment of my invention and represent one form in which said principle may be carried out, the car floor is composed substantially wholly of dumping doors. Two channel beams *a*, *a*, together with the cover plate *c* and lower connecting member *d*, form the center sill of the car. The center sill, however, as well as the remainder of the car underframe may be of other construction than that illustrated. Extending outwardly from the center sill to the sides of the car are cross bearers *e* upon the ends of which the sides of the car are supported. The door operating shafts *g* are pivoted in the cross bearers adjacent their outer ends and beneath the side walls of the car *f*. In the present instance I have shown a stationary strip *h* projecting inwardly from the sides of the car and overlying the shafts *g*. It will be obvious, however, that the inwardly extending floor strip might be dispensed with and the shaft moved farther outward to increase the door opening. Inasmuch as my invention resides more particularly in the doors and their operating mech- anism, and is not restricted to any particular construction of the standard parts of the car, it will be understood that considerable latitude may be exercised in the precise location and arrangement of the respective parts. In any event, the shafts *g* are spaced sufficiently beneath the lower surface of the car floor to permit the outer edge of the door to enter the space between the shaft and car floor or car side.

In the opening and closing of doors constructed according to my invention, each door has two movements. In the closing operation, the door first moves pivotally upon one of its edges as a center toward the opening in the car floor, and after this movement is completed the door is moved bodily across the door opening to bring its outer edge above the operating shaft, and in this last movement it is preferably given a further thrust upward against the under side of the floor, by reason of its tapered outer edge.

In order to permit the two movements above referred to, I have in the present instance shown the door *i* pivoted to one end of links *j*, the other ends of which links are pivoted to brackets *k* supported by the center sill. It is obvious, however, that the door movement described can be permitted in a variety of ways and that the link connection above described is merely one specific means of accomplishing this result. Adjacent their outer edges, the doors are provided with downwardly projecting lugs *l* and chains or other flexible connections *m* are secured to said downward projections and to the operating shafts *g*.

Any suitable means may be provided for rotating the operating shafts *g*. In the present instance the operating shaft projects through the end sill of the car and upon the projecting end is loosely mounted a lever *n* provided with a reversible pawl *o* adapted to engage a star wheel *p* fast upon the shaft *g*. A detent *q* pivoted to the end of the car is adapted to hold the shaft against backward rotation while the door is being closed. My invention, however, is not confined to any particular means of rotating the operating shaft, and that described and illustrated is merely an example of a familiar and suitable mechanism for this purpose. The lugs *l*, or other parts of the under surface of the outer edges of the doors, are roughened and tapered outward, as shown at s, toward the edges of the doors, and corresponding co-acting roughened surfaces r are provided on the operating shafts g.

Referring to the left-hand side of Fig. 1 of the drawing, it will be apparent that upon rotating the shaft g to wind the chain thereon, the door will be raised from the position shown in solid lines to that shown in dotted lines, and that the continued winding of the chain after the dotted line position is reached will have the effect of drawing the door bodily toward the outer side of the car, thus causing its outer edge to pass over the shaft g. In passing over the shaft g the outer edge of the door will be firmly wedged into contact with the under surface of the car floor, by reason of the co-action of the inclined surface s with the co-acting part of the winding shaft. During the outward movement of the door from the dotted line position shown at the left of Fig. 1 to the position shown at the right, the inner edge of the door will rise into contact with the under surface of the projecting edge of the cover plate c, by reason of the turning of the links j upon their lower pivots from the position shown at the left to that shown at the right of Fig. 1. Both edges of the door are thus brought firmly in contact with the under surface of the floor around the edges of the door opening and a tight closure of the car is secured.

In opening the doors, the shafts will be rotated in the direction to unwind the chains therefrom. Referring to the right-hand of Fig. 1, the first effect of rotating the shaft in this direction will be through the engagement of the roughened surfaces r and s of the shaft and door, respectively, to cause the door to move bodily inward from the position shown at the right-hand of Fig. 1 to a position corresponding to that shown in dotted lines at the left-hand of that figure, whereupon a continued unwinding of the chain will permit the door to drop to its open position.

I claim:

1. In a car of the class described, a floor provided with a door opening, a door mounted at one edge of said opening to have a pivotal movement with respect to the door opening and a bodily movement transversely of said opening, a support beneath the floor and adjacent the opposite edge of the door opening, and means for moving said door pivotally toward said opening and transversely thereof to carry its free edge over said support.

2. In a car of the class described, a floor having a door opening, a rotatable shaft mounted adjacent one side of said opening, a door mounted at the opposite side of said opening and having a pivotal movement toward and from said opening and a bodily movement transversely thereof, and means connecting said shaft and door, whereby rotation of said shaft imparts a pivotal movement to said door and a movement transverse of the door opening to carry the edge of said door over said shaft.

3. In a car of the class described, a floor having a door opening, a door, hinges between one edge of said door and a fixed part of the car, said hinges permitting the door to have a pivotal and a bodily movement, a rotatable supporting shaft beneath the floor level and adjacent the edge of the door opening opposite said hinges, means for rotating said shaft, and a chain connected at one end to said shaft and at the other end to said door.

4. In a dump car, a center sill, a floor provided with a door opening, a door connected at one edge to said center sill, said connection comprising means whereby said door may move toward and from said opening and transversely thereof, cross beams, a shaft rotatably mounted in said cross beams adjacent the outer edge of said door opening and spaced beneath the lower surface of the floor, a flexible connection between said shaft and said door adjacent its free edge, and means for rotating said shaft.

5. In a dump car, a floor provided with a door opening, a door mounted adjacent one edge of said opening, means whereby said door is permitted a movement toward and from said opening and transversely thereof, a rotatable shaft beneath the floor level and adjacent the opposite edge of said opening, a flexible connection between said shaft and said door adjacent its free edge, said shaft being roughened and a coacting roughened part on said door, and means for rotating said shaft.

6. In a dump car, a floor provided with a door opening, a door mounted adjacent one edge of said opening, means whereby said door has a movement toward and from said opening and transversely thereof, a rotatable shaft mounted beneath and spaced from the lower surface of the floor adjacent the other edge of said opening, an inclined part on the outer edge of said door adapted to co-act with said shaft, a flexible connection between said shaft and said door, and means for rotating said shaft.

7. In a dump car, a floor provided with a door opening, a door mounted adjacent one edge of said opening, means whereby said door may be moved toward and from said opening and transversely thereof, said door having a tapered part adjacent its edge, a rotatable shaft beneath the floor level adjacent the opposite edge of said opening, a flexible connection between said shaft and door, and means for rotating said shaft.

8. In a dump car, a floor provided with a floor opening, a door, links each pivoted at one end to a fixed part of the car and at the opposite end to said door adjacent one edge thereof, a rotatable shaft beneath the floor level and adjacent the edge of said door opening opposite said links, a flexible connection between said shaft and the free edge of said door, and means for rotating said shaft to raise said door and to move the same bodily over said shaft.

9. In a car of the class described, a floor provided with a door opening, a door, links each pivoted at one end to a fixed part of the car and at the opposite end to said door, a rotatable shaft beneath the floor level and adjacent the edge of said opening opposite said links, and a flexible connection between said shaft and said door, said shaft being said shaft roughened, and said door having a roughened part adjacent its outer edge.

10. In a car of the class described, a floor provided with a door opening, a door, links each pivoted at one end to a fixed part of the car and at the opposite end to said door, a rotatable shaft beneath the floor level and adjacent the edge of said opening opposite said links, and a flexible connection between said shaft and said door, said shaft being roughened and said door having a roughened and tapered part adjacent its edge.

11. In a dump car, a floor provided with a door opening, a door mounted adjacent one edge of said opening, means whereby said door is permitted movement toward and from said opening and transversely thereof, a rotatable shaft mounted beneath the floor level and adjacent the opposite edge of said door opening, a downward projection adjacent the free edge of said door, a flexible connection between said shaft and said downward projection, and means for rotating said shaft.

12. A car of the class described having a bottom comprising dumping doors pivoted to the car structure and also bodily movable relative to the car structure, a rigid support for the doors when in closed position, and means for displacing the doors with reference to their support to permit the doors to move pivotally to open position.

13. In a car of the class described, a floor composed substantially wholly of drop doors, each door being hinged adjacent one edge of an opening and being also bodily movable transversely of said opening, a support adjacent the opposite edge, and means for moving said door pivotally toward said opening and bodily into engagement with said support.

14. A car of the class described having its floor composed substantially wholly of dumping doors, each door being hinged adjacent one edge of an opening and being bodily movable transversely of said opening, a rigid support for each of said doors when in closed position, and means for displacing the door bodily with reference to its support to permit the door to move pivotally to open position.

15. In a car of the class described having its floor composed substantially wholly of dump doors, each of said doors having a pivotal movement toward and from the door opening and a bodily movement transversely thereof, a rotatable shaft, and means connecting said shaft and door, whereby rotation of said shaft imparts a pivotal movement to said door, and a movement transverse of the door opening to carry the edge of said door over said shaft.

16. Car door mechanism comprising in combination with a door mounted to swing about one of its edges and to move bodily, an operating shaft, and connections therefrom to the door, said door being bodily movable by said connections to bring its free edge over the lifting shaft.

17. Car door mechanism comprising in combination with a door mounted to swing about one edge and to move bodily, a lifting shaft, flexible connections therefrom to the door arranged to lift said door, and independent connections between the shaft and door arranged at the end of the closing movement to move said door bodily to bring its free edge over said shaft.

18. Car door mechanism comprising in combination with a door mounted to swing about one of its edges and to move bodily, an operating shaft, and connections therefrom to the door, said door being bodily movable by said connections to bring its free edge over a support adjacent the door opening.

19. Car door mechanism comprising in combination with a swinging bodily movable drop door, a lifting shaft, and connections therefrom to the door arranged to lift the door to closed position and at the end of the closing movement to move said door bodily and bring its free edge over a support adjacent the door opening.

20. Car door mechanism comprising in combination with a door mounted to swing about one edge and to move bodily, a lifting shaft, connections therefrom to the door, and independent connections between the door and shaft and arranged to move the door bodily and bring its free edge over a support adjacent the door opening.

21. Car door mechanism comprising in combination with a door mounted to swing about one edge and move bodily, a lifting shaft, and connections therefrom to the door arranged at the end of the closing movement to move said door bodily over a support adjacent the door opening, said connections including a rack fixed to the door and an inter-engaging gear on the shaft.

22. Car door mechanism comprising in combination with a door, supports for one edge of the door about which said door can swing and on which it can move bodily, a lifting shaft, a flexible connector therefrom to the opposite edge of the door, and independent means actuated from the shaft arranged to move the door bodily at the end of the closing movement and bring its free edge over a support adjacent the door opening.

In testimony whereof, I have subscribed my name.

FREDERICK SEABERG.

Witnesses:
    LILLIAN A. KIBBY,
    FLORENCE FLORELL.